US006322654B1

(12) United States Patent
Walter et al.

(10) Patent No.: US 6,322,654 B1
(45) Date of Patent: Nov. 27, 2001

(54) METHOD OF TRANSFERRING A COLORED DECORATION TO AN ARTICLE

(75) Inventors: Thomas Walter; Maximilian Zaher, both of Oldenberg (DE)

(73) Assignee: Bush Industries, Inc., Jamestown, NY (US)

( * ) Notice: Subject to any disclaimer, the term of this patent is extended or adjusted under 35 U.S.C. 154(b) by 0 days.

(21) Appl. No.: 09/417,391

(22) Filed: Oct. 13, 1999

(30) Foreign Application Priority Data

Oct. 13, 1998 (EP) ..................... 98119327

(51) Int. Cl.$^7$ ..................... B44C 1/175; B32B 31/20; B05D 3/00; B05C 3/00; B41M 3/12

(52) U.S. Cl. ..................... 156/230; 156/236; 156/237; 156/240; 156/247; 156/277; 156/289; 427/146; 427/147; 427/149; 427/336; 118/402; 118/403; 428/914

(58) Field of Search ..................... 156/230, 236, 156/237, 239, 240, 247, 277, 289, 155, 285; 427/146, 147, 149, 280, 430.1, 336, 434.4; 428/194, 914; 118/402, 403, 404; 101/33, 34

(56) References Cited

U.S. PATENT DOCUMENTS

| | | | |
|---|---|---|---|
| 4,010,057 | 3/1977 | Nakanishi | 156/384 |
| 4,229,239 | 10/1980 | Arai et al. | 156/155 |
| 4,231,829 | 11/1980 | Marui et al. | 156/230 |
| 4,269,650 | 5/1981 | Arai et al. | 156/540 |
| 4,348,246 | 9/1982 | Nakanishi | 156/73.1 |
| 4,353,942 | 10/1982 | Carey | 427/434.3 |
| 4,388,866 | 6/1983 | Nakanishi | 101/426 |
| 4,407,881 | 10/1983 | Shima et al. | 428/156 |
| 4,436,571 | 3/1984 | Nakanishi | 156/384 |
| 5,695,587 * | 12/1997 | Dumoux | 156/230 |

FOREIGN PATENT DOCUMENTS

| | | | |
|---|---|---|---|
| 424258 | 4/1991 | (EP) . | |
| 573676 | 12/1993 | (EP) . | |
| 726170 | 8/1996 | (EP) . | |
| 2645077 | 10/1991 | (FR) . | |
| 1125458 | 8/1968 | (GB) . | |
| 54108704 | 8/1979 | (JP) . | |
| 60192617 | 10/1985 | (JP) . | |
| 62080025 | 4/1987 | (JP) . | |
| 62146698-A * | 6/1987 | (JP) | B41M/3/12 |
| 09001996-A * | 1/1997 | (JP) | B44C/1/175 |

* cited by examiner

*Primary Examiner*—Richard Crispino
*Assistant Examiner*—J. A. Lorengo
(74) *Attorney, Agent, or Firm*—Webb Ziesenheim Logsdon Orkin & Hanson, P.C.

(57) ABSTRACT

A method is disclosed for transferring a colored decoration to an article by applying the decoration onto a first support, transferring the printed decoration onto a second support and then transferring the decoration to the article. To transfer the decoration, it is floated upon a liquid and the article is pressed against the floating decoration.

7 Claims, 1 Drawing Sheet

METHOD OF TRANSFERRING A COLORED DECORATION TO AN ARTICLE

BACKGROUND OF THE INVENTION

1. Field of the Invention

The invention relates to a method of transferring a colored decoration to an article using a liquid on which the colored decoration floats and into which the article is immersed in order to transfer the colored decoration to the article.

2. Description of the Related Art

U.S. Pat. No. 4,010,057, corresponding to German Patent No. DE-A-25 34 640, describes a method and apparatus for applying a decoration to an article using hydrostatic pressure. This patent is hereby incorporated by reference. However, this patent neither teaches nor suggests the use of transferring the decoration from one support to another prior to transferring the decoration to an article.

U.S. Pat. No. 4,348,246 describes a transfer printing technique in which the film with the decoration to be transferred is not placed upon a layer of water but instead is placed upon a layer of granules of such fine grains that the decoration and the supporting granules conform to the curved surface of the article, thereby enhancing the contact of the decoration against the article.

U.S. Pat. No. 4,388,866 describes a transfer printing technique in which the film with the decoration to be transferred is placed upon a deformable layer of pins which can be adapted to the shape of the article, thereby enhancing the contact of the decoration against the article.

U.S. Pat. No. 4,436,571 describes a transfer printing technique in which the article to receive a decoration is immersed in a specific way into a flowing liquid with the decoration floating thereupon. The article is presented to the decoration in a continuous movement in the general direction of the liquid flow along a downward path oblique to the surface of the liquid and then along an upward path oblique to the surface of the liquid to provide contact between the decoration and the article.

U.S. Pat. No. 4,229,239 describes another transfer printing technique in which the decoration is prepared before the transfer by a solvent in order that it detaches itself more easily from the supporting film.

U.S. Pat. No. 4,407,881, corresponding to DE-A-32 19 992, describes a transfer printing technique in which the decoration is supported on a layer of a special film made of a hydrophilic, deformable layer which can swell by absorption of water, and a further layer which is placed over the hydrophilic layer and is varyingly permeable to water so that the hydrophilic layer expands to a greater or lesser extent.

U.S. Pat. No. 4,231,829 describes another transfer printing technique in which boric acid or a salt thereof is added to a PVA film supporting the decoration on the liquid or to the water on which the decoration floats in order to promote the transfer process.

U.S. Pat. No. 4,269,650 also describes a transfer printing technique utilizing the addition of a solvent in order to make the detachment of the decoration from the supporting film easier.

European Patent Application No. EP 0 573 676 A1 describes the use of a support having a release characteristic for applying colored decoration to a substrate. In this prior art document, the colored decoration is first applied to a support having a release characteristic. A coating material is then applied over the colored decoration which has been applied to the support. The coating material is subsequently subjected to partial cross linking, and then, under pressure and/or elevated temperature, the partially cross linked coating material together with the colored decoration is transferred from the support to the substrate which is ultimately to be decorated. This transfer takes place in such a way that the coating material lies on the substrate under the colored decoration. Finally, further cross linking of the coating material takes place on the substrate.

In transfer printing the colored decoration (also called the printing pattern) is on a film, which supports the decoration. The colored decoration and film are floated on a water surface where they are extended (stretched) and/or condensed (compressed). For this extending or condensing of the floating decoration and film, the prior art discloses air blowers which are arranged over the decoration and film to extend and/or to condense the decoration with the film by means of an air flow, i.e., to expand it in certain directions, depending on the shape of the article to be printed, and, if appropriate, to compress it in other directions.

The use of a liquid filled tank to support a decoration for applications to an article is also known and is considered to be prior art.

U.S. patent application Ser. No. 08/946,802 filed Oct. 8, 1997 now U.S. Pat. No. 6,001,206 issued Dec. 14, 1999, entitled "Method and Apparatus for Applying a Decoration to an Article"; U.S. Pat. No. 5,908,525 issued Jun. 1, 1999 and entitled "Method and Apparatus for Applying a Decoration to an Article" and U.S. Pat. No. 5,916,400 issued Jun. 29, 1999 and entitled "Method and Apparatus for Manipulating an Article for Applying a Decoration Thereon" are hereby incorporated by reference.

Typically in transfer printing a decoration from a support film wherein the article is pressed against the decoration and support film as they float upon a liquid surface, a water-soluble support film such as polyvinyl alcohol (PVA) is used.

The PVA film is relatively expensive and is largely lost in the course of the transfer printing process. In the prior art, moreover, relatively thick PVA films are required in order to accomplish the dual task of permitting the printed application of the colored decoration to be of good quality and providing the decoration with the required stability. Furthermore, the PVA films are hygroscopic and absorb water. A thinner PVA film would absorb less water and have less influence on the overall characteristics of the PVA film/decoration combination.

The object of the invention is to improve the process of transferring a colored decoration to an article by using relatively thin film to support the colored decoration on the liquid surface. The thinner support film dissolves more rapidly in the liquid. Also storage of the components used in the method is simplified.

BRIEF SUMMARY OF THE INVENTION

The invention achieves these objectives by the following steps:

a) applying the colored decoration to a first support having a release characteristic, b) transferring the colored decoration from the first support to a second support, c) disposing the second support with the colored decoration on a liquid, and d) pressing the article into the colored decoration floating on the liquid in order to transfer the colored decoration to the article.

Through the use of the first and second supports it is possible to optimize the supports for their respective functions. The first support is chosen to be of a material which is readily printable. The first support is also chosen so that the colored decoration which is applied to it can be transferred easily to a second support. The second support has properties which make it particularly suitable for floating on a liquid surface and so has the properties required for transferring a decoration onto an article pressing the article against the decoration as the decoration floats on a liquid surface. Such properties include the ability of the second support to detach from the colored decoration in the liquid, especially by dissolving in the liquid itself.

The term "dissolving in the liquid" should be understood here not in the fairly narrow chemical sense, but rather in physical terms, to the extent that the material of the support film becomes detached from the colored decoration in the liquid or else afterwards when the article is removed from the liquid.

To enable the colored decoration to be transferred simply and completely from the first support to the second support, the first support is chosen so that it features a so-called release characteristic.

Supports having release characteristics are known in the art and described, for example, in European Patent Application No. EP 0 573 676 A1. Particularly suitable sheetlike supports having release properties are certain papers or else plastics films whose surface is designed or has been treated such that color films or coating films applied under certain conditions can be transferred to a substrate in the manner of a "peeling" process, as a decal peels from a surface. For the present invention, particularly suitable supports having a release characteristic are plastics films, which have a release coating which is suitable for achieving the release effect. One such plastics film is a polyester film.

The colored decoration is transferred from the first support to the second support. After this transfer, the second support floats upon the liquid, which may be water, and the colored decoration is supported upon the second support. The article is pressed into the colored decoration to transfer the decoration to the article.

A particularly suitable material for the second support is PVA. Because the second support is used only to support the decoration on the surface of the liquid while the decoration is transferred to the article, and is not used to support the colored decoration as it is being fabricated, the second support may be thinner. As a result, the second support dissolves more rapidly in the liquid and, also, the hygroscopic properties of the film become less critical.

In a preferred embodiment, after the colored decoration is transferred from the first support to the second support, a coating film is applied to the colored decoration. The coating film may consist of a coating material which is suitable for priming the article that is to be decorated. The coating film may include color.

BRIEF DESCRIPTION OF THE SEVERAL VIEWS OF THE DRAWINGS

In the text below, exemplary embodiments of the invention are described in more detail with reference to the drawing, wherein.

DETAILED DESCRIPTION OF THE PREFERRED EMBODIMENTS

Figure 1:
FIG. 1 illustrates a schematic drawing of the result of a first method step in which a colored decoration is applied to a first support having a release characteristic.
Figure 2:
FIG. 2 illustrates a schematic drawing of the result of a further method step in which the colored decoration is transferred from the first support to a second support.

Directing attention to FIGS. 1 and 2, a first support 10 is printed with a colored decoration 12. In the exemplary embodiment discussed, the first support 10 consists of a polyester film which is readily printable and has release characteristics such that a decoration may be mounted upon the first support 10 and removed when necessary using a relatively easy process such as peeling the decoration from the first support 10. The colored decoration 12 consists preferably of diffusible dyes which are able to diffuse into a coating material or into the base material, which may be plastic, of an article. This is especially true when the coating material or plastic base material is heated.

Thereafter, in accordance with an exemplary embodiment, the colored decoration 12 is transferred from the first support 10 to a second support 14. Transfer takes place by means of the release characteristic of the first support. In other words, the colored decoration 12 is peeled like a decal from the first support 10 and deposited onto the second support 14.

In the exemplary embodiment the second support 14 consists of polyvinyl alcohol (PVA) but may consist of any other suitable second support material.

Figure 3:
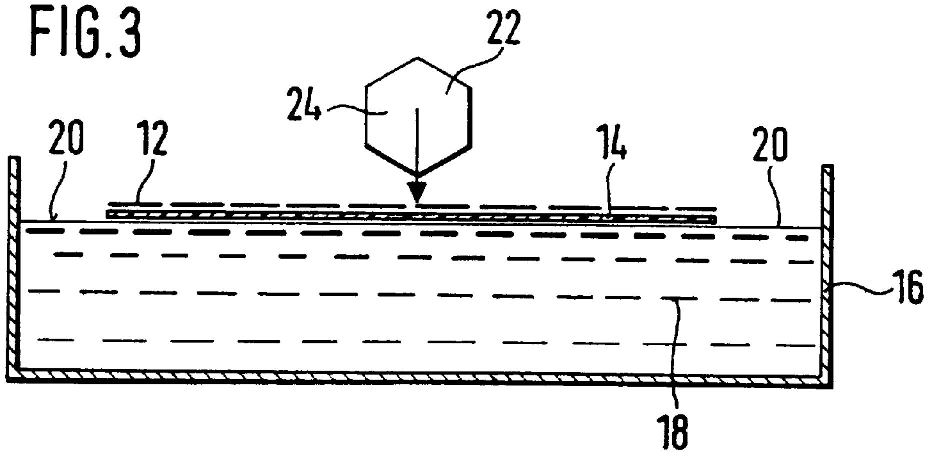
FIG. 3 illustrates a schematic drawing of the arrangement of the second support with colored decoration on a liquid surface and the immersion of the article that is to be decorated.

Directing attention to FIG. 3, the second support 14 with the overlying colored decoration 12 is floated upon the surface 20 of liquid 18 in a tank 16. An article 22 that is to be decorated is pressed in the direction of the arrow 24 into the colored decoration 12 and hence also into the liquid 18. The static pressure of the liquid presses the colored decoration film against the article 22 so that the colored decoration adheres to the article 22. The second support 14 dissolves in the liquid 18 or is removed from the article 22 prior to the time at which the article 22 is moved out of the liquid. With this, the dissolution and/or separation of the second support 14 from the colored decoration film 12 which is now applied to the article 22 is completed.

Figure 4:
FIG. 4 illustrates a schematic drawing of a variant of the method of FIGS. 1 to 3, in which a coating film is applied over the colored decoration.

FIG. 4 illustrates a second embodiment wherein following the transfer of the colored decoration 12 to the second support 14 (FIG. 2) a coating film 26 is applied over the colored decoration 12 (FIG. 4). Thereafter, the second support 14 with the colored decoration 12 and the coating film 26 is then deposited on the surface 20 of the liquid 18. The process of dipping the article 22 to be decorated takes place in an analogous fashion to the embodiment discussed above with reference to FIG. 3. Thereafter, the coating film 26 then lies bottom-most on the article 22, and the colored decoration 12 lies upper-most over the coating film 26.

The coating film 26 serves as a base coat on the article 22. The coating film 26 may have a diffusible disperse dye, thereby providing a base color which colors the article. For example, when the article 22 is to be decorated to simulate a walnut finish or the like, the base color chosen in the coating film is a suitable brown. In that case there is no need for the material of which the article 22 consists, which may be plastic, to be given extra coloring. In general, coloring of the article 22, when it is made of plastic material, is undesirable because it may alter the mechanical properties of the plastic material. For example, the impact strength may be reduced. In addition, the production of colored plastics materials for use in injection molding a colored article is disproportionately more complex than the production of uncolored plastics materials. Therefore, the coating film 26 as a colored base coat gives the article the appropriate coloration. The material chosen for the coating film 26 is preferably an opaquely pigmented base coat which has chemical properties which are the same as or similar to those of any binder which may be present in the colored decoration 12.

An article 22 decorated in accordance with the methods herein described as the subject matter of the subject invention can be provided with further films beyond the color films and coating films described. It is also possible for additional films to be applied between the films.

If, finally, an overlying coating film is applied, it can be cured preferably with a beam of electrons or by UV radiation. Other curing techniques using heat, for example, are also possible.

By controlled heating of the applied coating films it is also possible to bring about diffusion of the dye molecules of the diffusible disperse dye in the coating material. In this context the heating of the coating films may be carried out with a hot-gas jet which has, for example, a width which is small in comparison with the width of the colored decoration and of the coating films.

In this case it is preferred that the hot-gas jet is heated to a temperature at which it causes, or at least assists, the dye of the primary coating film 26 to diffuse into the overlying coating film adjacent to the article. This produces a very good aesthetic effect of the decorated article and, in particular, a certain depth effect of the coloration. The dye molecules diffuse different distances, depending on their molecular weight, into the overlying coating material, which has a positive effect on the visual impression of the decoration.

The adhesion of the films to one another and also the mechanical properties of the applied coating and dye films can be promoted by the hot-gas jet when it impinges on the top-most coating film. The narrow width of the hot-gas jet may act as a knife and may be guided linearly over the coating film. With this technique it is possible to achieve a precisely controlled increase in temperature for a defined time period to a defined depth of the films without the bottom-most coating film being increased to the same temperature as the top-most coating film on the substrate. By this means it is possible to control the diffusion of the dye molecules.

In the case of the colored decoration and coating of articles, the quality of the colored decoration in the marginal regions and edge regions of the article is frequently critical. The quality of the coated decoration in the edge region is promoted by linear motion of the hot-gas jet directed such that it contacts the affected edge or margin of the substrate with the color coating film and other coating films on the color coating film to cover the edge. For example, in the case of a right-angled edge the hot-gas jet heats both adjacent edges in the same manner.

The invention has been described with reference to the preferred embodiments. Obvious modifications and alterations will occur to others upon reading and understanding the preceding detailed description. It is intended that the invention be construed as including all such modifications and alterations insofar as they come within the scope of appended claims or the equivalents thereof.

We claim:

1. A method of transferring a colored decoration to an article, comprising the following steps:

a) applying the colored decoration to a first support having a release characteristic, b) providing a second support independently from the first support, c) transferring the colored decoration from the first support to a second support, d) applying a coated film to the colored decoration, e) disposing the second support with the colored decoration on a liquid, and f) pressing the article into the colored decoration floating on the liquid in order to transfer the colored decoration to the article.

2. The method according to claim 1 wherein the second support is detached from the colored decoration in the liquid.

3. The method according to claim 1 wherein the second support consists of a material which dissolves in the liquid without adversely affecting the colored decoration.

4. The method according to claim 1 wherein the second support comprises polyvinyl alcohol (PVA).

5. The method according to claim 1 wherein the coating film consists of a coating material suitable for priming the article.

6. The method according to claim 1 wherein the coating film includes a dye.

7. The method according to claim 6 further including the step of heating the coating film to promote the dispersion of the coating film dye into the colored decoration.

* * * * *